Sept. 11, 1923.                    E. FRANKLAND                    1,467,784
                              SPRING SUSPENSION FOR VEHICLES
                                  Filed March 24, 1922
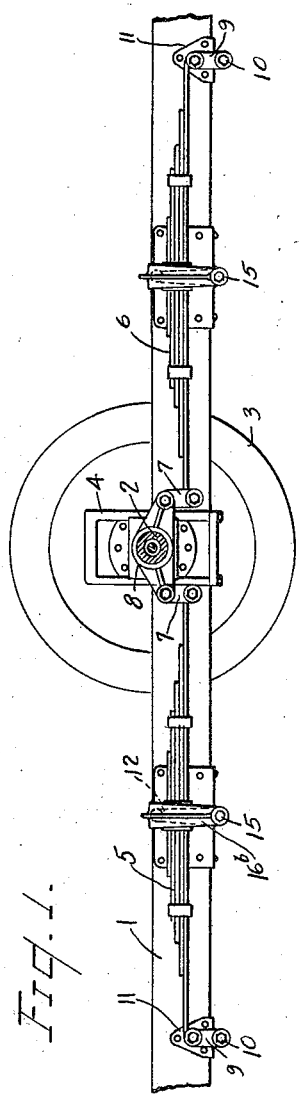
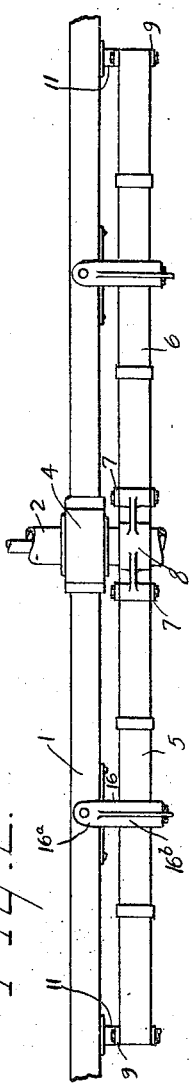
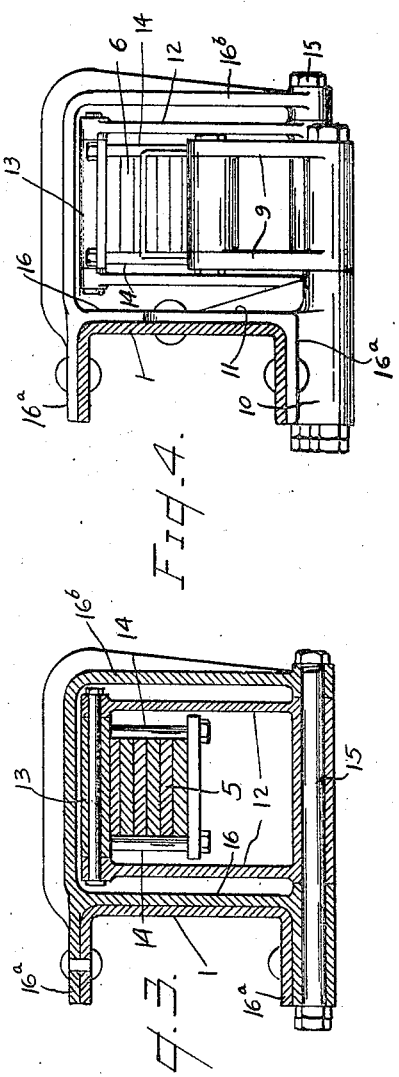
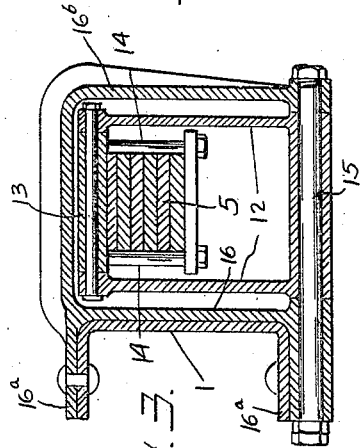
Inventor
Edwin Frankland Patented Sept. 11, 1923.

1,467,784

UNITED STATES PATENT OFFICE.

EDWIN FRANKLAND, OF PONTIAC, MICHIGAN.

SPRING SUSPENSION FOR VEHICLES.

Application filed March 24, 1922. Serial No. 546,345.

*To all whom it may concern:*

Be it known that I, EDWIN FRANKLAND, a subject of the King of Great Britain, residing at Pontiac, in the county of Oakland and State of Michigan, have invented new and useful Spring Suspensions for Vehicles, of which the following is a specification.

This invention relates to spring suspension for vehicles and more particularly for heavy duty vehicles such as omnibuses and trucks.

It is the object of the invention to provide a spring suspension, the springs of which will not be required to transmit draft stresses between the frame and axle, and correspondingly may act with maximum efficiency to cushion the load of the vehicle.

A further object is to mount a frame upon an axle by means of a pair of springs arranged in tandem, respectively forward and rearward of the axle, and movably engaging at their extremities said frame and axle.

A further feature of the invention is the movable engagement of a cushioning spring longitudinally with a vehicle frame at both an intermediate and a terminal point of said spring.

A preferred embodiment of the invention is hereinafter described, and is illustrated in the accompanying drawing, wherein, Fig. 1 is a view of the improved spring suspension in side elevation.

Fig. 2 is a plan view of the same.

Figs. 3 and 4 are enlarged cross-sections taken respectively on lines 3—3 and 4—4 of Fig. 1.

In these views the reference character 1 designates the frame, 2 an axle, and 3 a wheel of a motor vehicle. Each of the channel-shaped sides of the frame (of which one only is shown) has a vertically slotted guide yoke 4 through which the axle freely passes, provision thus being made for a direct transmission of draft stress from the axle to the frame, while permitting the relative vertical play between said members essential to cushioning of the load. Normally straight leaf springs 5 and 6 are arranged parallel to the sill 1 respectively forwardly and rearwardly of the axle. The adjacent ends of said springs are shackled as indicated at 7 to the axle, the latter carrying a sleeve bracket from which lugs project oppositely for engagement by the shackles 7. At their remote ends the springs 5 and 6 are shackled to the sill 1, as indicated at 9, the shackles being swung upon pins 10 each carried by an angle bracket 11 riveted or otherwise secured to the sill 1, as is best shown in Fig. 4.

The primary mounting of the springs upon the frame is arranged preferably at the center of each spring, being formed by shackles 12 (see Fig. 3) engaging at their upper ends a perch 13 clamped by bolts 14 to the spring and swung at their lower ends upon a bolt 15 secured to the frame. It is preferred to mount each bolt 15 in a bracket 16 having flanges $16^a$ riveted respectively to top and bottom of the sill 1 and further having the integral yoke arm $16^b$ supporting the outer end of said bolt.

In the use of the described suspension, the springs are relieved of any draft stresses, owing to the direct engagement of the axle with the guide members 4 (of which only one is shown). Consequently the resiliency throughout the entire length of said springs will be active in cushioning the load against shocks transmitted to the axle, so that a maximum of resilient efficiency is derived from said springs. The described construction is particularly advantageous for omnibuses, since the clearance between frame and road is considerably lower than has heretofore been practicable, thus permitting the vertical dimensions of the body (not shown) to be increased over present practice, without endangering the equilibrium of the vehicle. The location of the frame substantially in the horizontal plane of the axle, and of the springs substantially in the horizontal plane of the frame are the main factors in securing a low center of gravity which expresses in another way the advantage which has just been discussed.

By arranging the springs in tandem upon the vehicle frame as described and shown, the requisite cushioning effect is secured without increasing the unsprung weight on the axle or resorting to unduly heavy springs which would be responsive only to relatively severe shocks.

What I claim is:

In a vehicle spring suspension, the combination with the frame and an axle of a vehicle, of a pair of leaf springs arranged transversely of the axle, and respectively forwardly and rearwardly thereof, pivotal connections between the adjacent ends of said springs and the axle, pivotal connections between the remote ends of said springs and the frame, pivotal connections between the frame and springs, at substantially central points of the latter, two of said pivotal connections to each spring being established by shackles, and a connection between the frame and axle transmitting draft stresses independently of said springs.

In testimony whereof I sign this specification.

EDWIN FRANKLAND.